United States Patent [19]
Han et al.

[11] Patent Number: 5,828,796
[45] Date of Patent: Oct. 27, 1998

[54] OPTICAL SWITCH FOR REDUCING PROCESSING ERRORS IN A COUPLING REGION

[75] Inventors: Seon Gyu Han; Hye Young Kim; Myung Hyun Lee; Hyung Jong Lee; Yong Hyub Won, all of Daejeon, Rep. of Korea

[73] Assignee: Electronics and Telecommunications Research Institute, Daejeon, Rep. of Korea

[21] Appl. No.: 747,766

[22] Filed: Nov. 13, 1996

[30] Foreign Application Priority Data

Nov. 15, 1995 [KR] Rep. of Korea ..................... 95-41514

[51] Int. Cl.[6] ..................................... G02B 6/26
[52] U.S. Cl. ................... 385/9; 385/16; 385/40
[58] Field of Search ................... 385/1–4, 8, 9, 385/16, 39–42

[56] References Cited

U.S. PATENT DOCUMENTS

| | | | |
|---|---|---|---|
| 4,679,893 | 7/1987 | Ramer | 385/9 |
| 5,078,511 | 1/1992 | Noll et al. | 385/3 |
| 5,230,028 | 7/1993 | Lin et al. | 385/3 |
| 5,309,532 | 5/1994 | Chang et al. | 385/3 |

FOREIGN PATENT DOCUMENTS

| | | | |
|---|---|---|---|
| 62-183406 | 8/1987 | Japan | 385/3 |
| 3-131825 | 6/1991 | Japan | 385/3 |

OTHER PUBLICATIONS

High–Speed Polymeric 2×2 Electro–Optic Switches; J.I. Thackara, J.C. Chon, M. Jurich, and G.C. Bjorklund; pp. 283–284. (No Journal Name or Date).

A Beam Propagation Method Analysis of Active and Passive Waveguide Crossings; Andreas Neyer, Winfried Mevenkamp, Lars Thylen and Bo Lagerström; Jun. 1985; pp. 57–64, *Journal of Lightwave Tech.*, vol. LT–3, No. 3.

*Primary Examiner*—John D. Lee
*Attorney, Agent, or Firm*—Antonelli, Terry, Stout & Kraus, LLP

[57] ABSTRACT

An optical switch having reduced processing errors in a coupling region, according to the claimed invention includes an input portion having a pair of optical waveguides; an output portion having a pair of optical waveguides; a light phase shifting portion for inducing an additional phase change on light travelling in the input portion; a first light coupling waveguide for coupling between two light signals of the input portion and for providing a coupled signal with the light phase shifting portion; and a second light coupling waveguide for coupled between two light signals of the light phase shifting means and for providing a coupled signal with the output portion. The light coupling unit includes a waveguide. The switch reduces considerably any error that stems from manufacturing variations between waveguides in a coupling region since the waveguides share the error produced in a coupling region. The length of the switching element can be reduced since the coupled between waveguides is not indirect as in DC switches and BB switches. Due to the reduction in length, the output loss is reduced considerable.

1 Claim, 3 Drawing Sheets

OPTICAL SWITCH FOR REDUCING PROCESSING ERRORS IN A COUPLING REGION

BACKGROUND OF THE INVENTION

This invention relates to a 2×2 optical switch. There are generally two types of 2×2 optical switching elements in the prior art. One is the DC(Directional Coupler) switch and the other is the BB(Balanced Bridge) switch. FIG. 1A and FIG. 1B show a structure of electrodes and waveguides of the DC switch. FIGS. 2A and 2B show those of the BB switch. The prior art will be described with reference to these figures.

In the DC type optical switching elements as shown in FIG. 1A, the waveguides have two input ends and two output ends. The light incident on one input end travels along a first waveguide 1. The light forms a coupling mode when the second waveguide 2 lies in the same proximity. The light comes out of the output end of the second waveguide 2 if the length of a region where the coupling occurs is adjusted appropriately. The length of the region where the coupling occurs is called the coupling length 7. This coupling is dependent on the material used for the waveguides, the distance between two waveguides 8, and the thickness of the waveguides.

If this coupling uses an electro-optic material, for example $LiNbO_3$, polymer, etc., for the waveguides and an electric field is applied to a coupling region with electrode 11 and 12 as shown in FIG. 1B, the direction of the output light can be controlled by a drive voltage.

For the DC type coupling, having the simplest structure among 2×2 optical switches, two electrodes are placed between two waveguides. If an electric field is applied to one electrode for example the electrode 11 in FIG. 1B, the phase of the light in the corresponding waveguide changes. By adjusting the electric field intensity, the direction of the output light can be controlled.

The BB type 2×2 optical switch shown in FIG. 2A is a modification of the DC switch. In the 2×2 BB switch, the region where two waveguides placed in the same proximity of each other is divided into two regions 27 and 29, and between these divided regions is a region 28 of shifting phase. The length of two regions 27 and 29 where two waveguides are placed in the same proximity of each other is one half of the coupling length. The light 23 incident on the first waveguide 21 is coupled to the waveguide 22 at the region 27 where two waveguides meet for the first time, and the light is split equally between waveguides 21 and 22 and travels further. Another coupling occurs at the second region 29 where two waveguides meet, and then the output light 26 comes out of the waveguide 22. The voltage is applied to a phase shifting electrode 32 or another phase shifting electrode 35 to control output light position. Other electrodes 31, 33, 34, and 36 are used to compensate for manufacturing variations.

Of 2×2 optical DC or BB type switches, however, two waveguides in a coupling region are made separately, so the exact reproduction of waveguides required for the DC and BB switches is one of the shortcomings involved with these types because waveguides are very sensitive to manufacturing conditions.

SUMMARY OF THE INVENTION

It is accordingly an object of the invention to provide an optical switch having a coupling unit which includes a waveguide and that considerably reduces errors which stem from the different quality of waveguides by sharing the error in the coupling region of two waveguides. According to the present invention, this object is accomplished by providing an optical switch having reduced processing errors in a coupling region, comprising: input means having a pair of optical waveguides; output means having a pair of optical waveguides; light phase shifting means for inducing an additional phase change on light travelling in the input means; a first light coupling waveguide for coupling between two light signals of the input means and for providing a coupled signals with the light phase shifting means; and a second light coupling waveguide for coupling between two light signals of the light phase shifting means and for providing a coupled signal with the output means.

DETAILED DESCRIPTION OF THE PREFERRED EMBODIMENT

Figure 1A:
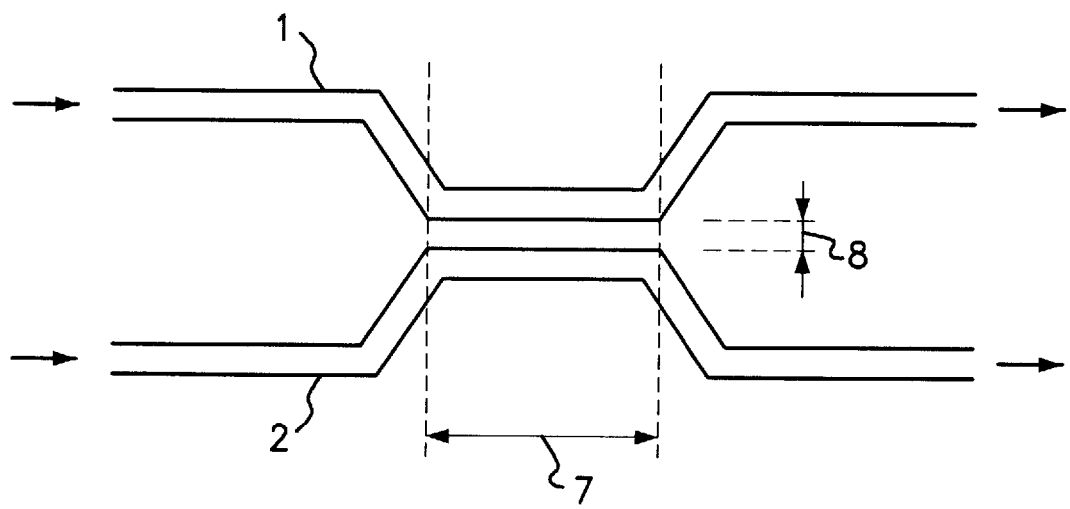
FIG. 1A and FIG. 1B show waveguides and electrodes of a DC(Directional Coupler) type 2×2 optical switch of the prior art.
Figure 1B:
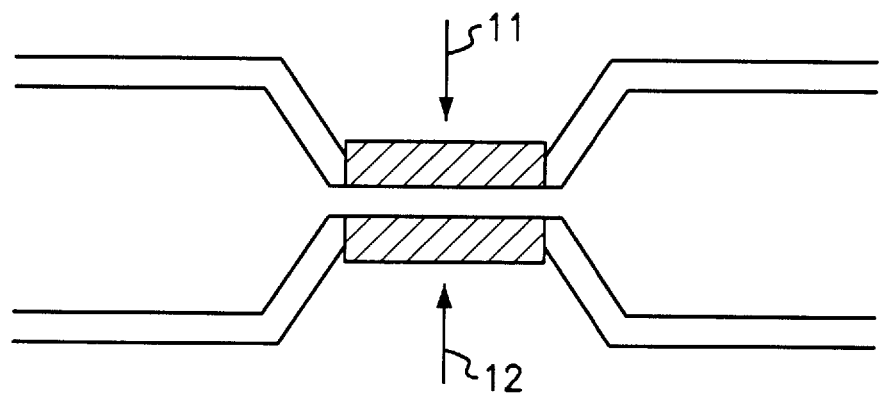
Figure 2A:
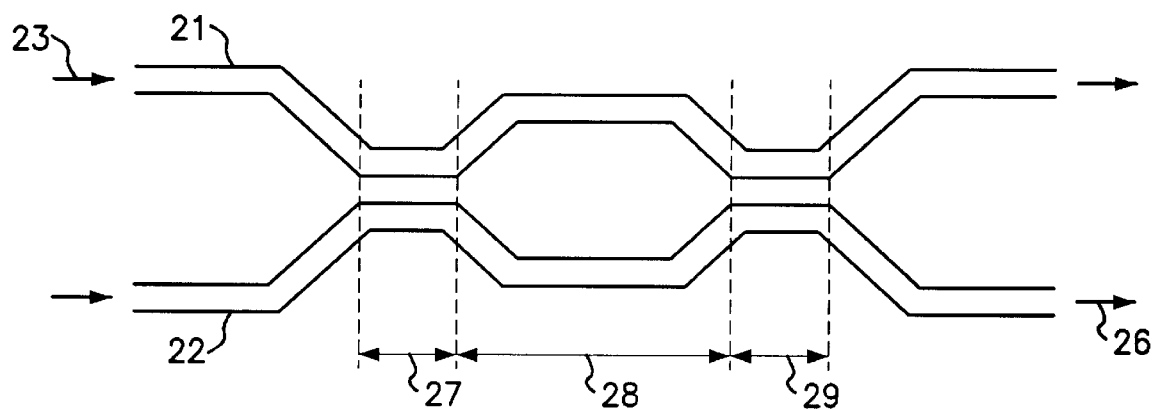
FIG. 2A and FIG. 2B show waveguides and electrodes of a BB(Balanced Bridge) type 2×2 optical switch of the prior art.
Figure 2B:
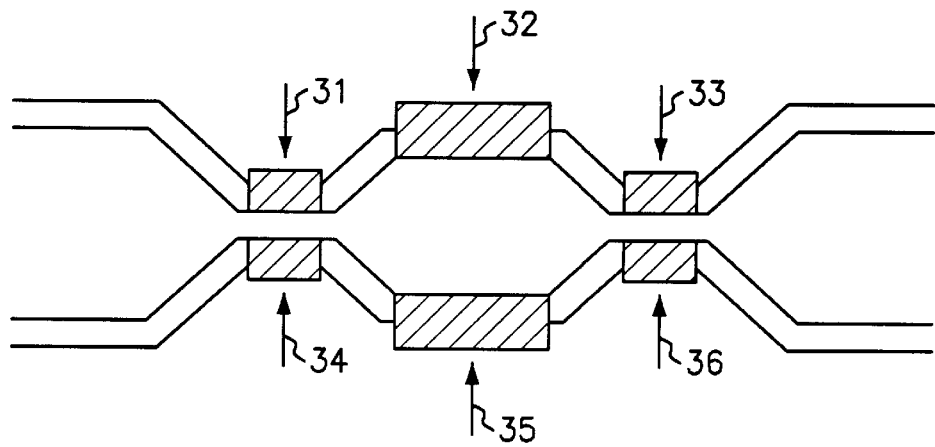
Figure 3A:
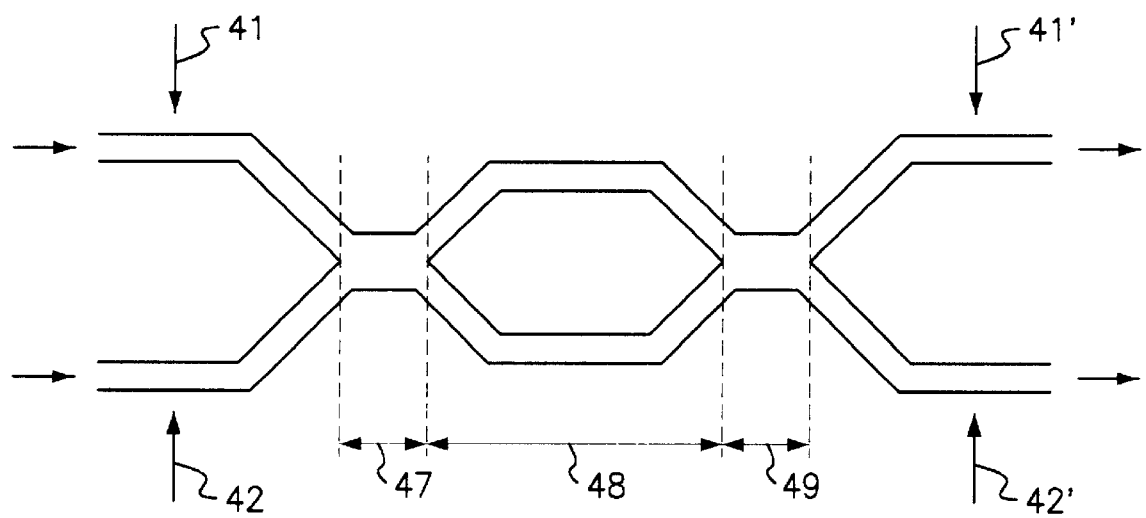
FIG. 3A and FIG. 3B show waveguides and electrodes of a 2×2 optical switch of the invention.
Figure 3B:
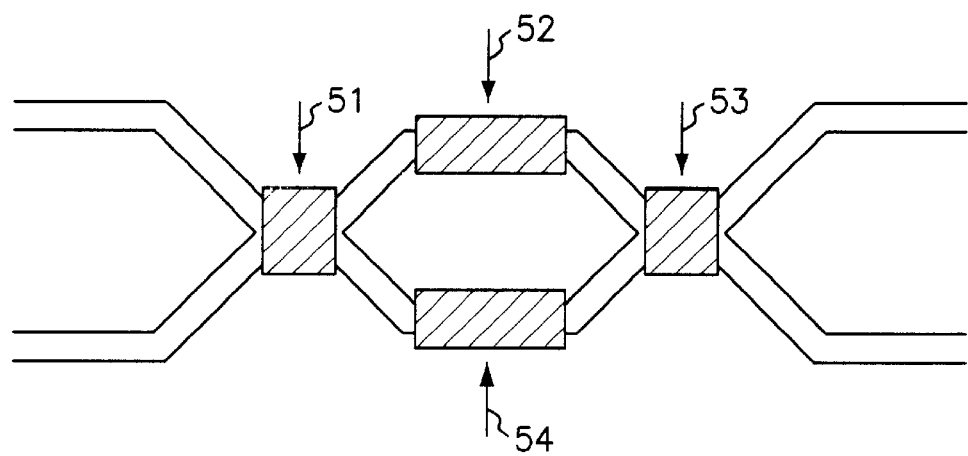

FIG. 3A and FIG. 3B show waveguides and electrodes of a 2×2 optical switch of the invention. The embodiment of the invention includes a pair of waveguides 41 and 42, light phase shifting unit 48, and light coupling units 47 and 49. As shown in the figures, the light phase shifting unit 48 can induce an additional phase change to the light traveling in the pair of waveguides, just as the BB type switch does. The light coupling units 47 and 49 respectively include one optical waveguide, and they are formed at the output end and the input end of the light phase shifting unit 48.

In the 2×2 optical switch of the present invention, since the light coupling unit includes one waveguide, the light that comes in through the waveguide 41 is coupled to the waveguide 42 at the light coupling unit 47 and the light split equally between two waveguides travels further. Subsequently, the light passes the light phase shifting unit 48. Then another coupling occurs at the light coupling unit 49. Finally the light comes out of the waveguide 42'.

The light phase shifting unit 48 is a functional block that controls the direction of the output light. As shown in FIG. 3B, the light phase shifting unit 48 controls the phase of the light by applying voltage to a first light phase shifting electrode 52 or a second light phase shifting electrode 54. The electrodes 51 and 53 shown in FIG. 3B compensate for the variation between two waveguides that stems from the manufacturing variation.

The light signal switching element of the invention has several advantages over those of the prior art: the error stems from the manufacturing variation of waveguides is reduced considerably since the light travelling along two waveguides share the error in the coupling region, for two waveguides are combined in the coupling region; the entire length of the switch becomes much shorter than that of the prior art because the coupling of the light traveling along two waveguides are not indirect as that of the DC or the BB type switches; the optical loss of an output signal is minimized because of the reduced total length of a switch; and the drive voltage is lowered due to the separation of the light phase shifting unit from the light coupling unit.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An optical switch for considerably reducing processing errors in a coupling region, comprising:

input means having a pair of optical waveguides;

output means having a pair of optical waveguides;

light phase shifting means for inducing an additional phase change on light travelling in said input means;

a first light coupling waveguide for coupling between two light signals of said input means and for providing a coupled signal with said light phase shifting means; and a second light coupling waveguide for coupling between two light signals of said light phase shifting means and for providing a coupled signal with said output means.

* * * * *

UNITED STATES PATENT AND TRADEMARK OFFICE
CERTIFICATE OF CORRECTION

PATENT NO.   : 5,828,796
DATED        : October 27, 1998
INVENTOR(S)  : HAN et al.

It is certified that error appears in the above-identified patent and that said Letters Patent is hereby corrected as shown below:

On the title page;

[73] Assignee:   Electronics and Telecommunications Research Institute, Daejeon, Rep. of Korea"

should read:

--[73] Assignees:   Electronics and Telecommunications Research Institute, Daejeon, Rep. of Korea; and Korea Telecommunication Authority, Seoul, Rep. of Korea--

Signed and Sealed this

Sixteenth Day of November, 1999

Attest:

Q. TODD DICKINSON

Attesting Officer

Acting Commissioner of Patents and Trademarks